United States Patent [19]
Taylor

[11] 3,887,290
[45] June 3, 1975

[54] SHAFT CONNECTING APPARATUS

[75] Inventor: Charles F. Taylor, Boulder, Colo.

[73] Assignee: Borg-Warner Corporation, Chicago, Ill.

[22] Filed: Aug. 9, 1974

[21] Appl. No.: 496,428

[52] U.S. Cl. .................................. 403/370; 74/421
[51] Int. Cl. ............................................. F16n 1/20
[58] Field of Search .......... 403/370, 371, 369, 356, 403/374; 74/421 R

[56] References Cited
UNITED STATES PATENTS

| | | | |
|---|---|---|---|
| 1,701,909 | 2/1929 | Carhart | 403/356 X |
| 2,570,604 | 10/1951 | Siegerist | 403/7 |
| 2,811,861 | 11/1957 | Rieser | 403/370 X |
| 3,257,070 | 6/1966 | Kuklinski | 403/371 X |
| 3,560,031 | 2/1971 | Gilmour, Jr. | 403/359 |
| 3,590,652 | 7/1971 | Strang | 74/421 |

*Primary Examiner*—Andrew V. Kundrat
*Attorney, Agent, or Firm*—Aubrey L. Burgess

[57] ABSTRACT

Apparatus for mounting, securing and dismounting a shaft mounted speed reducer to and from a shaft which comprises two interconnected rings at each end of the quill shaft of the speed reducer. One of the rings is a reinforcing ring with approximately half its bore length making a snug fit on the quill shaft and the other approximately half the bore being tapered outwardly to accept a tapered step of a grip ring. The reinforcing ring is split for clamping onto the quill shaft and the grip ring, with a clamping screw fitted across the split. A pattern of radially and axially oriented tapped holes to receive cap screws provide the means for securing the reinforcing ring to the quill shaft and for pulling the grip ring axially toward the reinforcing ring. The grip ring is also split, is stepped and flanged. The step is tapered to match the taper of the reinforcing ring, so that when pulled axially into the reinforcing ring by the cap screws passing through its flange, the grip ring shrinks radially to grip the shaft to be connected to the quill shaft. The grip ring and quill shaft are keyed; the key may be of a special section to reduce key overturn.

14 Claims, 8 Drawing Figures

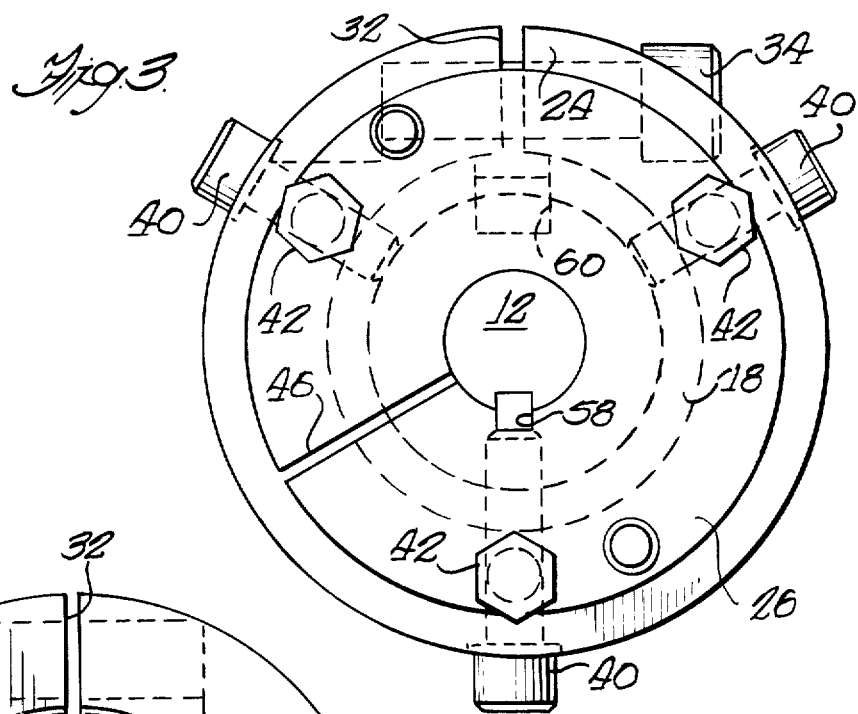
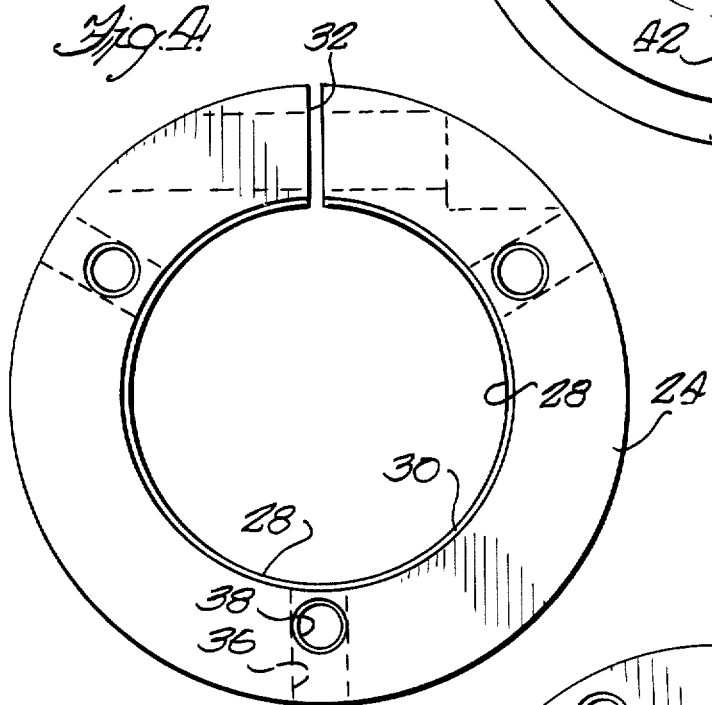
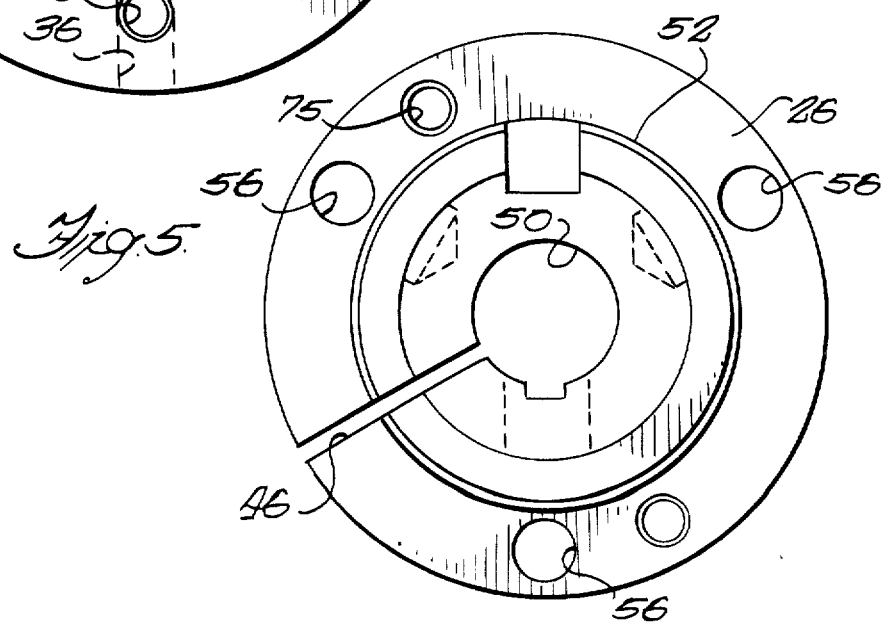

3,887,290

SHAFT CONNECTING APPARATUS

BACKGROUND OF THE INVENTION

Shaft mounted speed reducers include a cylindrical quill shaft through which the shaft to which the reducer is connected passes. There are many arrangements for connecting or locking the quill shaft to the shaft. One such arrangement is the use of a pair of flanged bushings having an axially extending and tapered portion keyed to the shaft and which are drawn inwardly toward the speed reduced by capscrews received in rings mounted on the ends of the quill shaft to radially shrink the tapers onto the shaft and thus make the connection. Another arrangement uses an axially extending tapered bushing connected to the quill shaft and a cylindrical locking nut surrounding the bushing to move it axially and thus lock the bushing to the shaft.

THE INVENTION

The invention comprises, in its broadest aspects, apparatus for connecting together two shafts of different diameters. To accomplish this, a pair of interconnected rings are used. One of these rings is a reinforcing ring with a portion of its bore adapted to snugly fit the outside of the larger of the two shafts and the other portion of its bore having an outwardly tapered contour to accept the tapered part of the second or grip ring. The reinforcing ring is split for clamping with a clamping screw fitted across the split. A pattern or plurality of tapped holes, each receiving a capscrew, provide for securing the reinforcing ring to the larger shaft and for pulling in the grip ring.

The grip ring is also split and is stepped and flanged, the step being tapered to match the reinforcing ring taper. Thus when forced axially into the reinforcing ring by the capscrews in the flange, because of the split the grip ring shrinks radially to grip the smaller of the shafts.

Conventional keys and keyways in the grip ring and shafts may be used to key the shafts and grip ring together.

The invention finds particular use in mounting, securing and dismounting a shaft mounted speed reducer having a cylindrical quill shaft which is to be connected to a rotatable shaft. In this usage, a pair of interconnected rings are used at each end of the reducer's quill shaft.

By providing a selection of grip rings with different diameter internal bores various shaft diameters can be accommodated. The external configuration of the selection of grip rings can generally be the same, i.e., with a flange and a taper portion or step.

As a modification of the invention, a particular cross-sectional configuration of key, known as a "thunderbird" key can be used in the keyways. Because of an effective increase in width of this type of key, an increase in resistance to key overturn is provided.

For disengaging the grip ring after removing the capscrews and clamping screw of the reinforcing ring, jackscrews are inserted in a plurality of tapped openings and act to push against the reinforcing ring to move the grip ring axially away from the speed reducer.

THE DRAWINGS

FIG. 3 is an end view of the structure of FIG. 1;

FIG. 4 is an illustration of the reinforcing ring of FIG. 1;

FIG. 5 is an illustration of the grip ring of FIG. 1;

DETAILED DESCRIPTION

Figure 1:
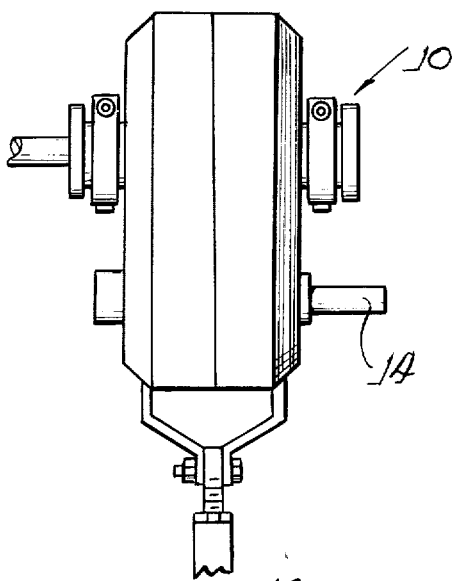
FIG. 1 is a side view of a shaft mounted speed, reducer with its quill shaft mounted on a shaft and connected thereto according to this invention.
Figure 2:
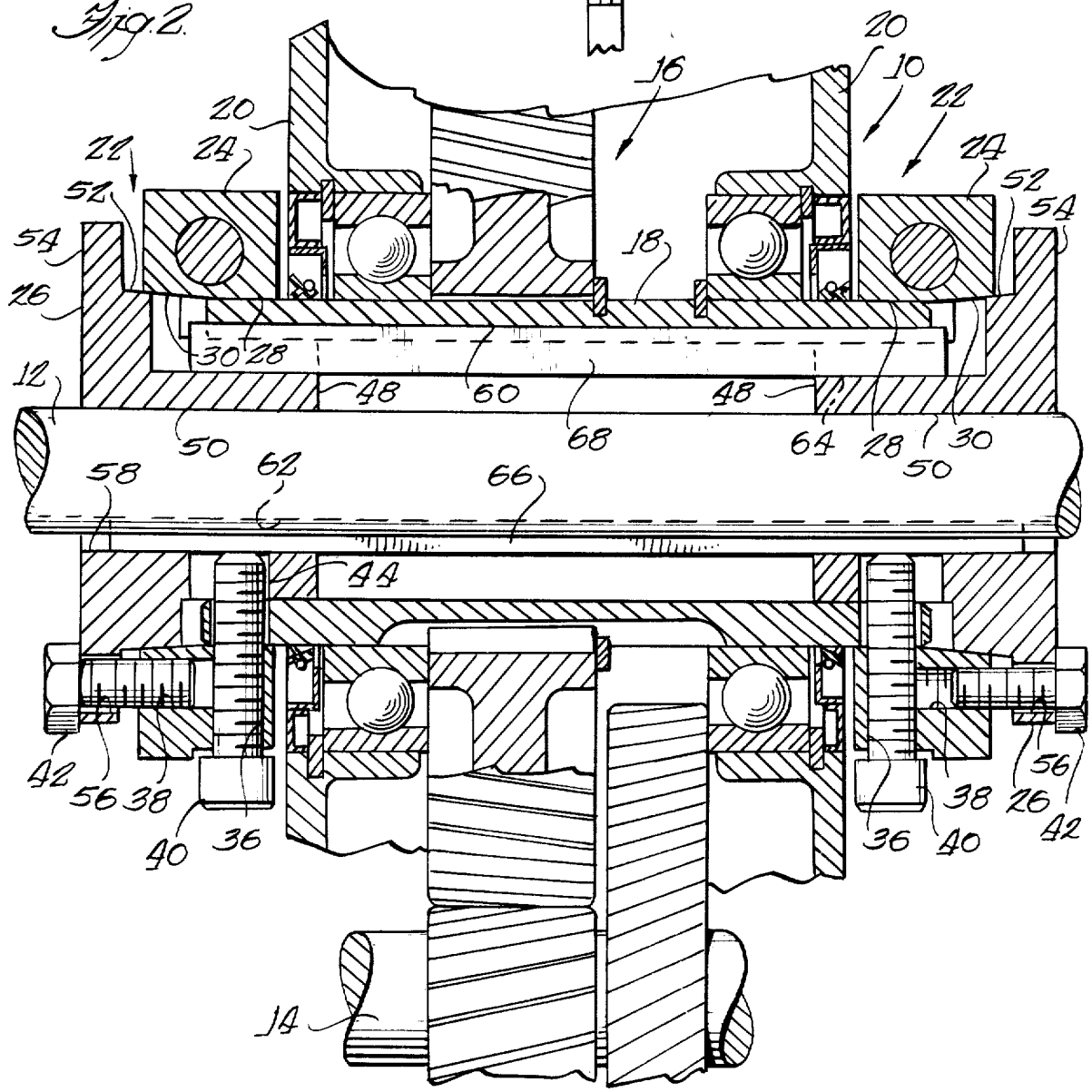
FIG. 2 is a longitudinal section through FIG. 1.

FIGS. 1 to 5, inclusive, illustrate a shaft mounted speed reducer 10 connected to a shaft 12. The speed reducer, is conventional in construction, and includes generally, a shaft 14 driven from a source of power (not shown), and reduction gearing 16 driven by the shaft 14 and driving a cylindrical quill shaft 18. As is usual, the quill shaft 18 extends beyond the side walls 20 of the speed reducer housing. The shaft 12 is connected or locked to the quill shaft 18 by locking means generally identified as 22 at each end of the shaft 18. The locking means 22 comprises a pair of interconnected rings, hereinafter referred to as a reinforcing ring 24 and a grip ring 26. The reinforcing ring 24 has approximately half its bore, identified as 28, of a size to engage the outside of the quill shaft extensions and approximately half its bore tapered, as at 30. The ring 24 is split at 32 and a clamping screw 34 is fitted across the split to draw the ring together and into clamping engagement with a portion of the grip ring 26, as will be described, and into clamping engagement with the quill shaft 18. The ring 24 is also radially and axially tapped at a plurality of locations 36, and 38, respectively, each to receive a capscrew 40 and 42, respectively, the capscrews 40 passing through corresponding bores 44 in the quill shaft 18.

The grip ring 26 is split as at 46, has an axial, cylindrical portion 48 with a central bore 50 engaging the shaft 12, a step 52 tapered to match the taper 30 of the ring 24, and a radial flange 54. The cylindrical portion 48 is smaller than the bore of the quill shaft to prevent possible rusting or "fretting" together and the tapered step engages the taper 30 of the ring 24. When the ring 24 is drawn together by the capscrew 34, the grip ring shrinks radially to positively grip the quill shaft 18. The flange 54 is axially drilled at 56 for the passage of the capscrews 42 received in tapped holes 38, so that the ring 26 can be drawn toward the quill shaft 18 and into the reinforcing ring 24 and the action of the tapers 30 and 52 forces the grip ring into positive wedging grip with the shaft. Conventional internal keyways 58 and 60, respectively, in the quill shaft 18 and the ring 26, and keyways 62 and 64 in the shaft 12 and the ring 26, receive keys 66 and 68, respectively, to key the quill shaft 18 to the shaft 12.

Figure 6:
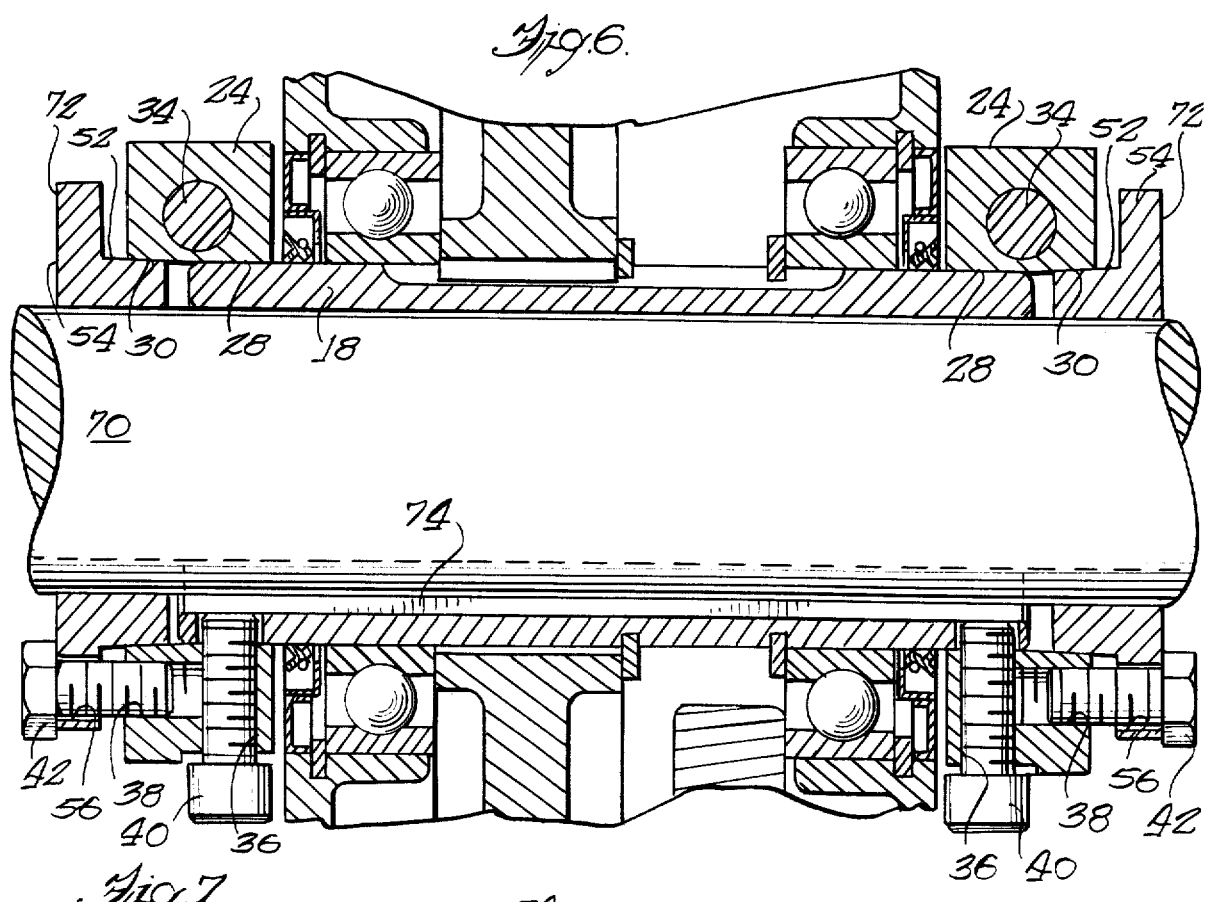
FIG. 6 is a longitudinal section similar to FIG. 2 but showing the connection of the speed reducer to a different size shaft.
Figure 7:
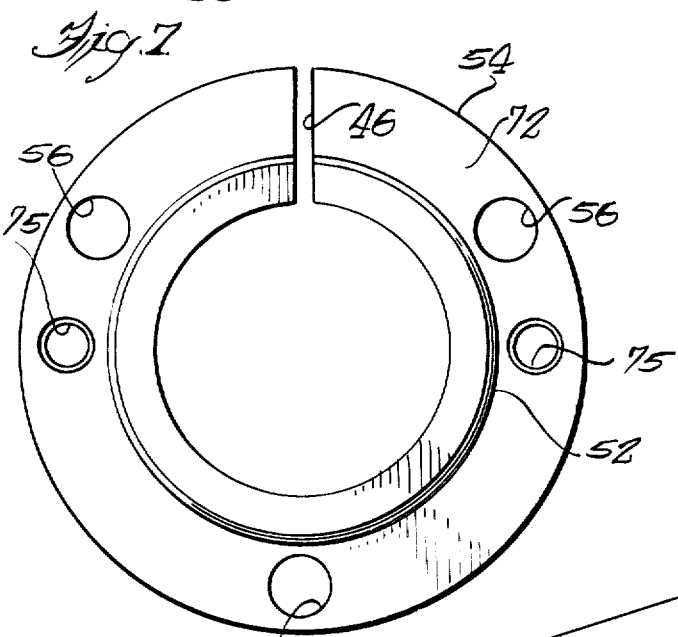
FIG. 7 is an illustration of the grip ring of FIG. 6.

The primary difference between the structure of FIGS. 1 to 5 and that in FIGS. 6 and 7 is the size of the shaft to which the speed reducer is to be connected, the shaft being identified here with the reference numbered 70, and also the shape of the grip ring, identified here with the reference numeral 72. The function of the grip ring 26 and the grip ring 72 are the same. In FIGS. 6 and 7, the reference numerals of the parts are the same (except for 70 and 72) as in FIGS. 1 to 5.

The grip ring 72 has a central bore to receive the shaft 70, a tapered step 52 matching the taper 30 of the ring 24 and a radial flange 54. The flange 54 is drilled at 56 for the passage of the capscrews 42 and also is split at 46. The basic difference between the grip rings is the lack of the cylindrical portion 48. Here the quill shaft 18 is directly keyed to the shaft 70 by the key 74. Otherwise the structure and function of the parts is the same as in the FIGS. 1 to 5 embodiment.

In each embodiment, there are provided a plurality of spaced tapped openings 75 in the grip ring (see FIG. 5). By removing the capscrews 42 and the clamping screw 34, and inserting and turning jackscrews in the openings 75, the grip ring can be moved axially away from the reducer and the connection can be disengaged.

Figure 8:
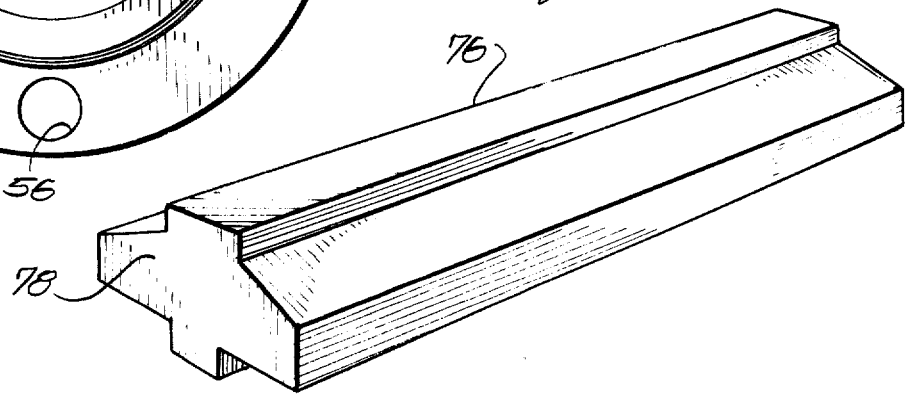
FIG. 8 is a perspective illustration of a "thunderbird" key.

To provide increased resistance to key overturn, a different cross-sectional key may be used, which is referred to for purposes of description as a "thunderbird" key because of its cross-sectional shape and which is illustrated in FIG. 8, and identified as 76. As readily understood, this key can be substituted for the keys 66, 68 and 74, and because of its shape, i.e., having a wide longitudinal central portion 78 which engages the bore of the quill shaft, presents a greater resistance to forces which tend to produce key overturn.

I claim:

1. Apparatus for connecting and locking a first shaft to a second shaft of larger diameter comprising:
   a split grip ring having its internal bore to receive said first shaft and having an external tapered shoulder portion;
   a split reinforcing ring having a portion of its internal bore substantially complimentary to said tapered portion of said grip ring and which engages said portion of said grip ring, so that when drawn toward each other said grip ring shrinks to grip said first shaft;
   said reinforcing ring also having a portion of its internal bore engaging said second shaft;
   means to radially clamp said reinforcing ring to said second shaft and to said grip ring; and
   means to axially draw said grip ring toward said reinforcing ring to thereby shrink and grip said first shaft.

2. Apparatus as recited in claim 1 in which said means to axially draw said grip ring toward said ring comprise at least one axial opening in said grip ring outwardly of said internal bore and at least one tapped opening in said reinforcing ring in alignment with said axial opening and a capscrew received in said openings.

3. Apparatus as recited in claim 2 further comprising a radial flange on said grip ring, said flange having said axial opening therethrough.

4. Apparatus as recited in claim 1 further comprising a clamp screw to draw the ends of said reinforcing ring together to clamp said reinforcing ring onto said second shaft and onto said grip ring.

5. Apparatus as recited in claim 4 further comprising at least one radially disposed tapped opening on said reinforcing ring and capscrews in said opening to secure said reinforcing ring to said second shaft.

6. Apparatus as recited in claim 1 further comprising means for keying said shafts together.

7. Apparatus as recited in claim 6, in which said means for keying said shafts together comprises a "thunderbird" cross-sectioned key.

8. Apparatus for connecting a shaft mounted speed reducer to a first shaft, said speed reducer having a cylindrical quill shaft with portions extending axially from its housing and said first shaft extends through said quill shaft;
   a split grip ring having its internal bore to receive said first shaft and having an external tapered shoulder portion;
   a split reinforcing ring having a portion of its internal bore substantially complimentary to said tapered portion of said grip ring and which engages said portion of said grip ring, so that when drawn together, said grip ring shrinks to grip said first shaft;
   said reinforcing ring also having a portion of its internal bore engaging said quill shaft;
   means to radially clamp said reinforcing ring to said quill shaft and to said grip ring; and
   means to axially draw said grip ring toward said reinforcing ring to thereby shrink and grip said first shaft.

9. Apparatus as recited in claim 8 in which said means to axially draw said grip ring toward said ring comprise at least one axial opening in said grip ring outwardly of said internal bore and at least one tapped opening in said reinforcing ring in alignment with said axial opening and a capscrew received in said openings.

10. Apparatus as recited in claim 9 further comprising a radial flange on said grip ring, said flange having said axial opening therethrough.

11. Apparatus as recited in claim 8 further comprising a clamp screw to draw the ends of said reinforcing ring together to clamp said reinforcing ring onto said quill shaft and onto said grip ring.

12. Apparatus as recited in claim 11 further comprising at least one radially disposed tapped opening on said reinforcing ring and capscrews in said opening to secure said reinforcing ring to said second shaft.

13. Apparatus as recited in claim 8 further comprising means for keying said shafts together.

14. Apparatus as recited in claim 13, in which said means for keying said shafts together comprises a "thunderbird" cross-sectioned key.

* * * * *